March 6, 1934. E. FRANKE 1,950,106
PROCESS FOR THE MANUFACTURE OF BORIC ACID FROM SODIUM TETRABORATE
Filed Sept. 30, 1930
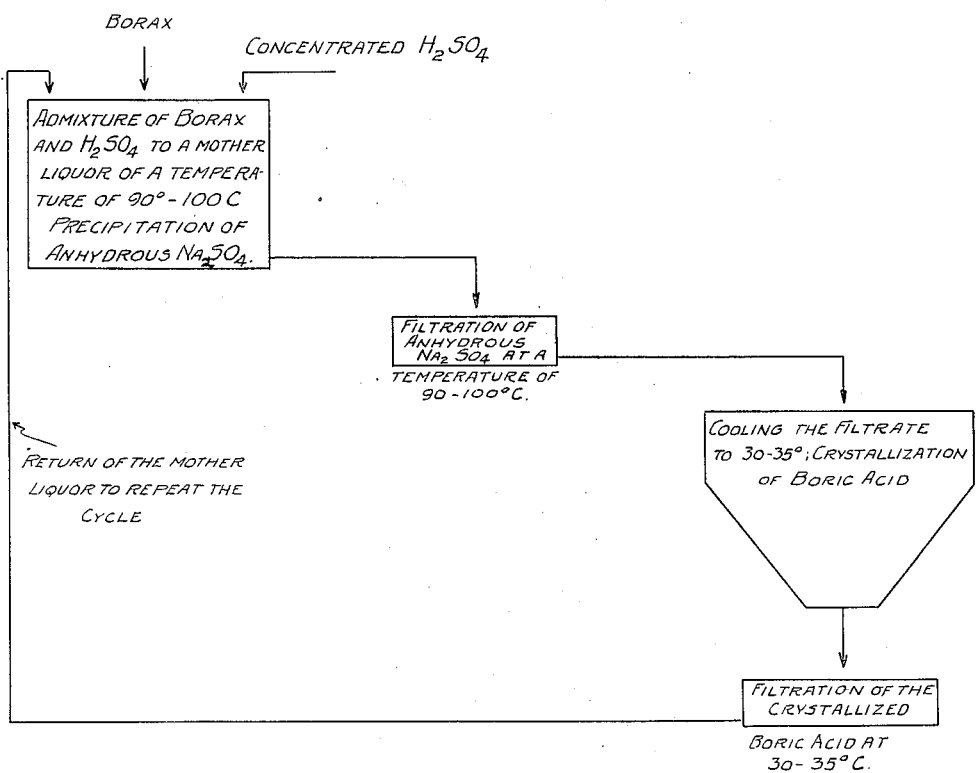
EMIL FRANKE
INVENTOR
BY
ATTORNEY Patented Mar. 6, 1934

1,950,106

UNITED STATES PATENT OFFICE 1,950,106

PROCESS FOR THE MANUFACTURE OF BORIC ACID FROM SODIUM TETRABORATE

Emil Franke, Grunau-Berlin, Germany, assignor to Chemische Fabrik Grunau Landshoff & Meyer Aktiengesellschaft, Grunau-Berlin, Germany Application September 30, 1930, Serial No. 485,555
In Germany October 22, 1929

1 Claim. (Cl. 23—149)

If sodium tetraborate or its hydrates be decomposed with sulphuric acid, boric acid and sodium sulphate are obtained. The complete separation of the two components requires special measures. It has been attempted to separate the sodium sulphate by means of alcohol. Lately attempts have been made to solve the problem by increasing the solubility of the boric acid after the separation of the main portion of the boric acid by a further addition of borax and separating the sulphate as a deca-hydrate.

I have now found that I can produce the boric acid free from sulphate by cooling the hot solution obtained after the decomposition, only to the point of conversion of sodium sulphate, that is by cooling it to 30° to 35° C. Since the solubility of sodium sulphate at the point of conversion is greater than at higher temperatures, while the solubility of the boric acid is altered inversely the boric acid crystallizes out free from sulphate. Preferably the process according to the reaction mentioned above is carried out cyclically by starting from a sulphate solution saturated with boric acid and adding thereto sodium tetraborate and, at an elevated temperature, sulphuric acid. By this procedure the sulphate formed in the reaction is separated as an anhydrous salt, while the boic acid remains in solution. After removing the sulphate e. g. by filtration by means of a filter press or the like the liquor is cooled down to 30°-35° C., as a result of which the boric acid crystallizes out free from sulphate. The boric acid is freed from the adhering liquor in a centrifugal machine and the remaining liquor is used over again for a new batch. By proceeding as above described anhydrous sodium sulphate is produced at the same time as a by-product.

The process as described above is therefore a great technical improvement over previous processes, particularly as the alkali borate beds lately found have acquired great importance for the manufacture of boric acid since they contain alkali borate, especially tetraborate.

Obviously, instead of artificial tetraborate the natural salt can also be employed for the manufacture of pure boric acid.

The present process is illustratively exemplified in the accompanying drawing indicating details as to temperature ranges at the various stages and the nature of the substance treated at any stage, and the heating and cooling steps.

Example 1

1000 litres of mother liquor from a previous batch containing 360 kilos $Na_2SO_4$ and 90 kilos $B(OH)_3$ are heated up to 90° or 100° C. Into that hot solution 153 kilos of borax and 40 kilos of concentrated sulphuric acid of 66° B are introduced. Sodium sulphate in an anhydrous state separates out and is removed from the solution by means of a filter press. The liquor is then cooled down to 30° to 35° C. Boric acid crystallizes out and is freed from the mother liquor in a centrifugal machine. The product contains 98 to 99% $B(OH)_3$.

Example 2

1000 litres of the same liquor as in Example 1 are heated to 90° or 100° C. After introducing 83 kilos of calcined borax containing 98% $Na_2B_4O_7$ and 2% of water and 40 kilos of concentrated sulphuric acid of 66° B, the solution is filtered from the sodium sulphate precipitated and the boric acid separated by cooling the liquor down to 30° to 35° C.

What I claim is:—

A process for the manufacture of boric acid which comprises adding borax and concentrated sulphuric acid to a mother liquor heated to a temperature of 90° C. to 100° C. and containing sodium sulphate and boric acid, thereby precipitating anhydrous sodium sulphate, filtering the said anhydrous sodium sulphate from the solution, cooling the filtrate to a temperature of 30° C. to 35° C., thereby crystallizing boric acid out of the filtrate, separating the boric acid crystals from the resulting mother liquor, heating the mother liquor to a temperature of 90° C. to 100° C., adding borax and concentrated sulphuric acid to the hot mother liquor to repeat the cycle.

EMIL FRANKE.